United States Patent [19]

Eberl

[11] 4,227,498
[45] Oct. 14, 1980

[54] CENTRIFUGAL GOVERNOR, PARTICULARLY APPLICABLE FOR THE ALTERATION OF IGNITION OR INJECTION TIMING IN INTERNAL COMBUSTION ENGINES

[75] Inventor: Leonhard Eberl, Unterschleissheim, Fed. Rep. of Germany

[73] Assignee: Robert Bosch GmbH, Stuttgart, Fed. Rep. of Germany

[21] Appl. No.: 911,736

[22] Filed: Jun. 2, 1978

[30] Foreign Application Priority Data

Jun. 4, 1977 [DE] Fed. Rep. of Germany ....... 2725414

[51] Int. Cl.³ ............................................. F02M 39/00
[52] U.S. Cl. ......................................... 123/501; 64/25
[58] Field of Search ........ 64/25; 123/117 R, 139 AP, 123/146.5 A

[56] References Cited
U.S. PATENT DOCUMENTS

| 3,683,879 | 8/1972 | Timms | 123/139 AP |
| 3,791,171 | 2/1974 | Hofmann | 123/139 AP |
| 3,834,184 | 9/1974 | Hofmann | 123/146.5 A |

FOREIGN PATENT DOCUMENTS

| 2231592 | 1/1974 | Fed. Rep. of Germany | 64/25 |
| 2231593 | 1/1974 | Fed. Rep. of Germany | 64/25 |
| 576195 | 5/1924 | France | 64/25 |
| 816498 | 7/1959 | United Kingdom | 64/25 |

*Primary Examiner*—Ira S. Lazarus
*Assistant Examiner*—Magdalen Moy
*Attorney, Agent, or Firm*—Edwin E. Greigg

[57] ABSTRACT

A centrifugal governor is proposed which has particular applicability to the rpm-dependent variation of ignition or injection timing in internal combustion engines. The centrifugal governor is comprised primarily of a driving shaft and a driven shaft and of a governor disc removably connected with the driven shaft. One eccentric pair is situated on the governor disc for each flyweight; each eccentric pair is coupled with the driven shaft, which serves as the camshaft of an injection pump and may be rotated by the flyweights articulated on the eccentrics in order to vary the mutual rotary position of both shafts.

10 Claims, 3 Drawing Figures

CENTRIFUGAL GOVERNOR, PARTICULARLY APPLICABLE FOR THE ALTERATION OF IGNITION OR INJECTION TIMING IN INTERNAL COMBUSTION ENGINES

BACKGROUND OF THE INVENTION

The invention evolves from a centrifugal governor of the type that is capable through the use of flyweights to change the mutual rotary position of two coaxially arranged shafts. Such a centrifugal governor is already known (DT-OS No. 1,022,419), wherein the eccentric pair consisting of a adjusting eccentric and a compensating eccentric is fixed in a flange-shaped member of the driven shaft. If such a governor is not driven by means of a claw coupling, but instead by a gear wheel mounted on the outer circumference of the governor and driven by a reduction gear in the gear box of the engine, then depending on the given dimensions there cannot only be difficulties of installation but also limitations on the load capacity as well. In known governors of this type, the gear wheel is provided with a frontal flange, and the flange-shaped member of the driven shaft which bears the eccentric pair is situated between this frontal flange and a cylindrical recess in the gear wheel. The resultant limitation of space for installing the eccentric pair and the limited space which is available inside the gear wheel for the installation of the flyweights together impose a very severe limitation on the load capacity of the centrifugal governor. In addition, the available space for the flyweights is further reduced on the inside by the hub-shaped member of the injection governor which serves as a driven shaft. In practical embodiments of so-called "built-in injection governors" provided with gear wheels (that is, governors built into the injection pump) and also of so-called "projecting injection governors" (that is, governors mounted on the shaft), which are enclosed in an oil tight housing, the hub-shaped member of the driven shaft must be enlarged; thus, it is larger than the smallest distance between the borings enclosing the eccentric pairs. When this is done, the borings become inaccessible to through-running tools and must instead by machined like blind bores. Such a procedure makes the manufacture of these governors significantly more difficult and expensive. A further disadvantage is the inclusion of the flyweights in the axial bearings of the governor members, since only an axial loading (for example, a gear drive) moving in a predetermined direction can be used. In such projecting injection governors, possible tilting of the drive member which serves as the drive shaft must be prevented by a supplemental step bearing supported on the governor hub.

OBJECT AND SUMMARY OF THE INVENTION

The centrifugal governor according to the invention has the advantage that the governor plate, in the form of a ring disc, is simple to machine and forms a structural unit, together with the eccentric pairs and the flyweights articulated on them, which remains the same or else may be easily modified. By this means, the driving shaft, formed by the drive gear wheel, and the governor hub, comprising a bearing flange and a hub member accommodating the cam shaft of an injection pump, may be adjusted to the available dimensions of the engine and so embodied, completely independently of the other governor members. The arrangement of the governor disc and its removable connection with the driving shaft provided for in the invention enable the inclusion, within the same outer dimensions, of a reinforced and enlarged hub to receive the driven shaft as well as correspondingly larger flyweights with a larger path circumference, since the flyweights in a preferred embodiment of the invention can be inclined almost down to the root line of the gearing system, without regard for the bolting of the gear wheel.

Further advantageous embodiments and improvements of the centrifugal governor are made possible by the characteristics described hereinafter. Thus, a correction at the beginning of delivery cam be simply made by installing the governor on the motor, through the medium of the drive gear which is bolted to the governor disc and provided with elongated holes. An improved axial and radial bearing of the governor members which rotate in opposite directions to each other is made possible by means of the hollow space formed by a cylindrical recess in the frontal surface of the governor disc. Since the flyweights are no longer included in the axial bearing, as is the case with known governors, an axial loading or gear drive which derives from the drive train may be arranged as desired, and a supplemental step bearing to prevent tilting is no longer necessary.

The invention will be better understood as well as further objects and advantages thereof become more apparent from the ensuing detailed description of preferred embodiments taken in conjunction with the drawings.

DESCRIPTION OF THE PREFERRED EMBODIMENTS

Figure 1:
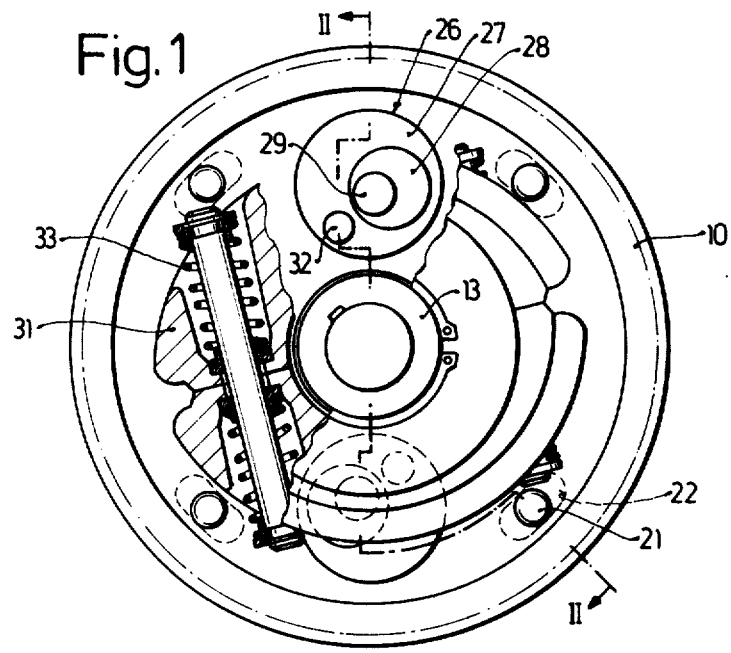
FIG. 1 is a partially cut-away view of the first exemplary embodiment.
Figure 2:
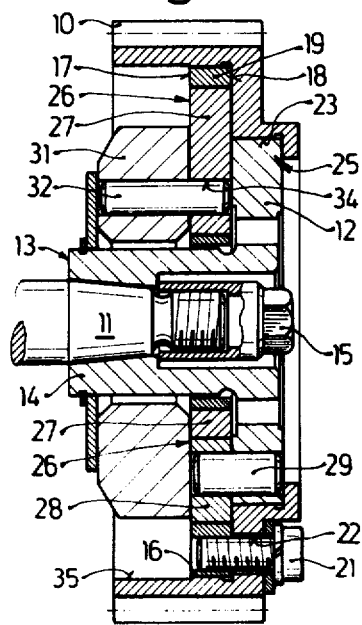
FIG. 2 is a cross section on the lines II—II of FIG. 1.

The first exemplary embodiment, shown in FIGS. 1 and 2, of a centrifugal governor for a fuel injection pump for diesel engines is envisioned as an open built-in injection governor to be installed in an enclosed drive housing or in the gear box of an engine.

The centrifugal governor serves in a manner already known to effect the rpm-dependent variance of the mutual rotary position of two coaxially arranged shafts, one of which being the driving shaft and the other being the driven shaft, whereby in the exemplary embodiment the injection timing of a fuel injection pump for diesel motors is changed. A driving member 10 formed as a drive gear functions as the driving means, and the driven shaft comprises the camshaft 11 of the injection pump (only partially shown) and a governor hub 13, which is provided with an integral bearing flange 12, the hub member 14 of which includes a lock nut 15.

A governor disc 19 with two frontal surfaces 17 and 18 which lie in parallel planes is set in a hollowed out section 16 of the gear 10 and is firmly affixed to this gear 10 by means of screws 21. The gear 10 is provided with oblong or slotted perforations 22, which serve to effect the corrections made at the beginning of fuel delivery; that is, when the screws 21 are partially loosened the gear 10 can be rotated relative to the governor plate, thereby changing the set position of the gear 10 relative to the camshaft 11 which serves as the driven shaft.

The connection between the governor hub 13 which is supported on the driven shaft 11 and the driving gear 10 which serves as the driving means is effected by two rotatably arranged eccentric pairs 26 that are provided in the governor disc 19 each of which comprise a adjusting eccentric 27 and a compensating eccentric 28. The compensating eccentrics 28 are connected with the bearing flange 12 of the governor hub 13 by means of a bolt 29 provided for each of them, and these serve to balance or equalize the height of the arc which would be reached by the midpoints of the adjusting eccentrics 27, if they were to rotate about the bolt 29 without the compensating eccentric 28 being provided. This rotation is effected by means of the flyweights 31, which move radially outward from the hub portion 14 of the governor hub 13 in accordance with the increasing centrifugal force associated with higher rpm and rotate the governor cam 27 by means of bearing pins 32 which are affixed eccentrically in the adjusting eccentrics 27. The bearing pins 32 are attached to the flyweights 31 and rotatably fixed in a boring 34 of the adjusting eccentrics.

During the described rotation of the adjusting eccentrics 27 a variation in the relative rotary position between the bearing flange 12 and the governor disc 19 takes place, whereby a corresponding according variation in the mutual rotary position of the driving and the driven shaft connected with these parts is produced. Accordingly, the proper governor angle for the appropriate rpm range can be determined by the disposition and pre-stressing of the governor springs 33.

Besides the cylindrical recess of the axial and radial bearing 23 and the boring 16, the drive gear 10 has a further recess 35 resulting from the lengthening of the boring 16 which is embodied as an outer stop or path limiter of the flyweights 31.

The governor disc 19 forms a structural unit with the eccentric pairs 26 fixed therein and the flyweights articulated on the adjusting eccentrics 27 which always remain the same for the same governor size. The form and position of the hub portion 14 of the governor hub 13 and of the drive gear 10 can be embodied as desired and suited to the available dimensions of the engine.

Instead of the driving member 10 embodied as a drive gear wheel, a similarly formed intermediate member can be used, to which a gear wheel that is supplied by the engine manufacturer can be attached. In the same way the driving member 10 can be provided with a clutch element when the cam shaft 11 is lengthened, and the driving shaft is attached to it. Although the centrifugal governor according to the invention is particularly well suited to installation inside the fuel injection pump, it can also be embodied as a closed and oil-filled shaft-mounted governor for fuel injection pumps when the drive member 10 is accordingly closed.

Figure 3:
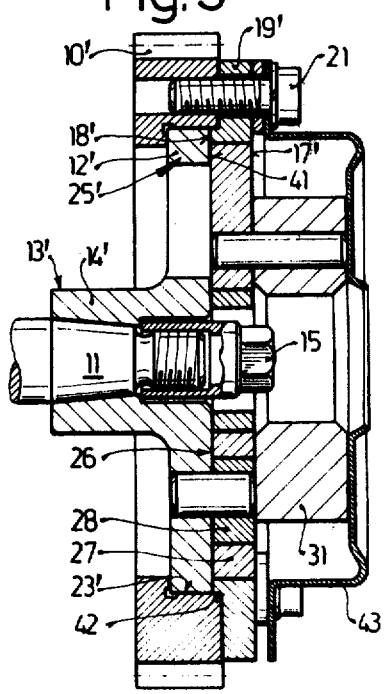
FIG. 3 is a cross section as in FIG. 2, but showing the second exemplary embodiment.

The second exemplary embodiment, shown only in cross section in FIG. 3, has, like the first exemplary embodiment shown in FIGS. 1 and 2, a drive gear wheel 10' screwed to the governor plate 19', which as shown in the first embodiment encloses the eccentric pairs 26. In a further variation of the first embodiment discussed above, the governor disc 19' with its frontal surface 18' is mounted in abutting relation with a frontal surface 41 of the governor hub 13' and the bearing flange 12' both of which are integral with the hub portion 14'. A recess 23' encompasses the outer diameter and the bearing surface, on the hub side, of the bearing flange 12'. The recess 23' and the frontal surface 18' of the governor disc 19' thereby comprise the hollow space 25' in the form of an annular groove which serves as an axial and radial bearing. Accordingly, this construction enables the attachment of the flyweights 31 on the surface 17' of the governor plate 19', said surface arranged to extend toward the governor hub 13' but not arranged to have any hub portion. This allows a certain leeway in the embodiment of the hub portion 14' and in the size of the flyweights 31, so that the flyweight mass can be greatly enlarged from the inside as desired, and yet there is no need to provide access for a tool to loosen the lock nut 15, since for this purpose it is enough to spread open the flyweights 31 against the force of the springs 33. The second frontal surface 18' of the governor plate 19', which lies opposite the frontal surface 17', is positioned in the same plane as the first frontal surface, as in the first exemplary embodiment. However, in this embodiment of the invention a step 42 is provided which effects the centering of the governor plate 19' in the recess 23' and at the same time eliminates the need for the boring 16 of the first embodiment described above. Thus, this characteristic makes it possible advantageously to reduce the total length of the governor. A hollow cylindrical oil container 43 is attached to the drive gear 10' and the governor disc 19' by means of the tap screws 21 and serves as both outer stop and path limiter for the flyweights 31.

The foregoing relates to preferred embodiments of the invention, it being understood that other embodiments and variants thereof are possible within the spirit and scope of the invention, the latter being defined by the appended claims.

What is claimed is:

1. A centrifugal governor comprising first and second coaxial rotary members between which a driving connection is established such that, in use of the governor, the relative rotational position between the two rotary members varies in accordance with their speed, said first rotary member being in the form of an annular member defining within its periphery a space into which said second rotary member projects, said second rotary member including a bearing flange, the governor further comprising:

(a) a disc releasably attached to said first rotary member, said disc having plane parallel faces;

(b) two eccentric pairs, each comprising an adjusting eccentric and a compensating eccentric, the adjusting eccentric being mounted for rotation in said disc and the compensating eccentric being mounted for rotation in the adjusting eccentric, the compensating eccentric being articulatedly connected to said flange by a pin mounted at an eccentric position on the compensating eccentric; and (c) two flyweights, each articulatedly connected to a respective adjusting eccentric by, on the side thereof facing away from said flange, a pin mounted at an eccentric position on the adjusting eccentric.

2. A centrifugal governor as claimed in claim 1, in which said first rotary member is provided with elongate holes and the disc is releasably attached to the first rotary member by bolts passing through said holes whereby, by slackening said bolts, an initial rotary adjustment is obtainable between said disc and said first rotary member.

3. A centrifugal governor as claimed in claim 1, in which said flange is received in an annular grovved-shaped cavity defined by a face of said disc and by a cylindrical recess provided in said first rotary member, whereby an axial and radial bearing is provided for said first rotary member.

4. A centrifugal governor as claimed in claim 1, in which said first rotary member includes an annular element having an inner surface which forms an outer stop for said flyweights.

5. A centrifugal governor as claimed in claim 3, in which the said bearing flange is provided at one end of a hub member, said hub member arranged to receive securing means for attaching it to a shaft, and further that said bearing flange includes a face remote from said hub member which comprises a plane surface and against which a face of said disc is adapted to abut.

6. A centrifugal governor as claimed in claim 3, in which an oil-collector container is secured to said first rotary member and forms an external stop for each said flyweight and also to prevent movement of each flyweight in a direction away from said disc.

7. A centrifugal governor as claimed in claim 1, in which said first rotary member has gear teeth on its outer periphery and constitutes a driving gear wheel.

8. A centrifugal governor as claimed in claim 7, in which said second rotary member is connected to a shaft which is thereby driven by said gear wheel.

9. A centrifugal governor as claimed in claim 8, in which said shaft is the cam shaft of a fuel injection pump for a diesel engine.

10. A centrifugal governor as claimed in claim 1, in which said disc is provided with elongate hole and is releasably attached to the first rotary member by bolts passing through said holes whereby, by slackening said bolts, an initial rotary adjustment is obtainable between said disc and said first rotary member.

* * * * *